May 17, 1949.                F. C. BAKER ET AL                    2,470,282
                      MOUNTING FOR SHAFTS AND THE LIKE
Filed July 28, 1947                                         2 Sheets-Sheet 1

INVENTORS
FREDERICK C. BAKER
E. GARY SPENCER
BY
ATTORNEY

May 17, 1949.  F. C. BAKER ET AL  2,470,282
MOUNTING FOR SHAFTS AND THE LIKE

Filed July 28, 1947  2 Sheets-Sheet 2

INVENTORS
FREDERICK C. BAKER
E. GARY SPENCER
BY
ATTORNEY

Patented May 17, 1949

2,470,282

UNITED STATES PATENT OFFICE 2,470,282

MOUNTING FOR SHAFTS AND THE LIKE

Frederick C. Baker and Elbert Gary Spencer, Portland, Oreg.

Application July 28, 1947, Serial No. 764,110

3 Claims. (Cl. 33—50)

This invention relates in general to the positioning and holding of the end of a shaft, bar, or similar member, in predetermined relationship and alignment with a supporting element.

More specifically, this invention relates to means whereby a member, such as a shaft, while acted upon by an axial or longitudinal thrust, will be accurately secured, in end to end engagement, with a supporting element, and thereby either be caused to rotate in unison with the supporting element in the event such element is rotated, or rigidly secured against any possible rotation whatsoever in the event the said supporting element is rigidly held stationary.

Our invention has many applications and uses, and these may be divided into two general groups; namely, one in which the member or shaft is desired to be accurately positioned and secured in axial alignment with a rotating element, and the other in which the member is desired to be accurately positioned and rigidly secured against any rotation or other movement whatever.

In order to describe and explain our invention clearly an example of each of these uses will be hereinafter briefly described.

An object of this invention is to provide a means whereby the end of a member, when the member is subjected to an axial or longitudinal thrust, or force, will be positively and accurately positioned and supported in predetermined relationship with an abutting supporting element.

A further object of this invention is to provide a means for end to end connection between a member and a supporting element in which the proper positioning and holding of the member in predetermined relative position will automatically take place when the member is subjected to a longitudinal thrust, or force and in which the connection between the member and the supporting element can be automatically released upon cessation of the longitudinal thrust or force.

An additional and specific object of this invention is to provide an improved and simplified means for securing the abutting ends of two shafts together in axial alignment regardless of the respective diameters of the shafts and regardless of whether the shafts are to be rotated in unison or rigidly held against rotation.

These objects and other advantages we attain in a very simple and practical manner by forming the abutting ends of the detachable member and its associated supporting element with identical grooving, the nature of which will be apparent from the following description in which reference is made to the accompanying drawings.

Figure 1:
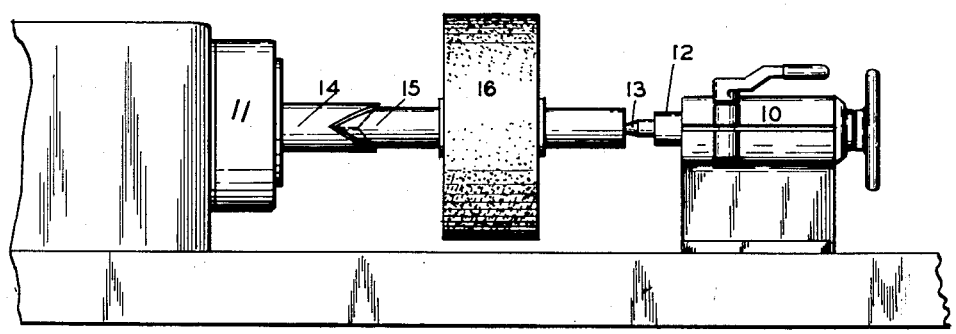
Fig. 1 is an elevation of an ordinary lathe assembly illustrating an example of how our invention may be employed when a shaft is to be removably mounted for rotation by, and in axial alignment with, a driving shaft.

Referring first to the lathe assembly illustrated in Fig. 1, 10 indicates the usual tail stock, 11 the head stock, 12 the tail stock spindle, 13 the lathe center, and 14 the driving shaft. A member or shaft 15 supporting a grinding wheel 16 is shown in place in the lathe. The right hand end of the grinding wheel shaft 15, as viewed in Fig. 1, is formed with the customary central tapered recess to receive the tip or lathe center 13 of the tail stock spindle 12. Our invention concerns the particular connection of the left hand end of member 15 with the abutting end of the driving shaft 14.

Figure 2:
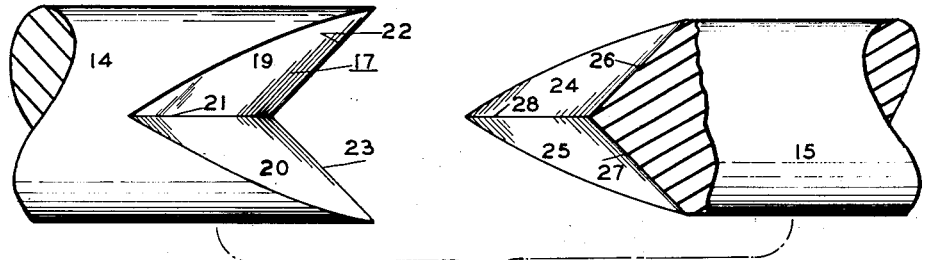
Fig. 2 is a fragmentary elevation, drawn to a larger scale, of the opposed ends of the driving and driven shafts of the assembly of Fig. 1, but showing the two shaft ends separated for clarity and with the end of the demountable driven shaft shown partly in section.
Figure 3:
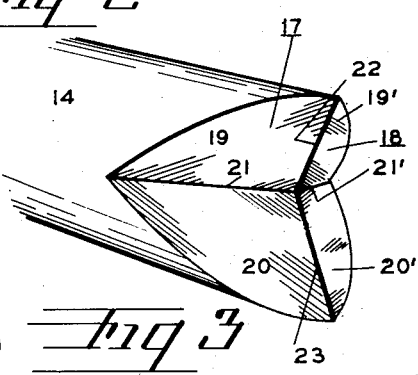
Fig. 3 is a view, in perspective, of the end of the driving or left hand shaft of Fig. 2.

Referring now to Figs. 2 and 3, a pair of identical, diametrically opposite, V-shaped grooves, indicated in general by 17 and 18, are formed in the end of the shaft 14. Each of these grooves comprises a pair of converging plane faces 19, 20 and 19' and 20'; the plane faces 19 and 20 converging on the bottom groove line 21, and the plane faces 19' and 20' converging on the bottom groove line 21'. The bottom groove lines 21 and 21' extend from the outer surface of the shaft at diagonally opposite points to the shaft axis in a forward direction toward the grooved end of the shaft. These two bottom groove lines 21 and 21', as apparent, meet on the shaft axis and the shaft axis lies in the plane determined by these two lines. The corresponding plane faces of the two grooves 17 and 18, thus the faces 19 and 19' and the faces 20 and 20' intersect respectively on the lines 22 and 23.

The plane determined by these two intersecting lines 22 and 23 is perpendicular to the plane determined by the intersecting lines 21 and 21' and the axis of the shaft also lies in the plane determined by lines 22 and 23. Furthermore all four lines of intersection, namely, the lines 21, 21', 22 and 23 are exactly the same length.

The abutting end of the shaft 15 is grooved in exactly the same manner as the end of shaft 14. When the two shafts are engaged end to end one shaft, thus the shaft 15, is turned or rotated 90° with respect to shaft 14. Thus in the portion of the grooved end of the shaft 15 which is shown in Fig. 2 one of the plane faces of each of the two grooves, corresponding to the grooves 17 and 18 of the shaft 14, are shown, namely the faces 24 and 25. The bottom groove line 26 of one of the grooves of shaft 15 corresponds to the line 21, for example, on shaft 14 and then similarly the bottom groove line 27 of the other groove in shaft 15 corresponds to line 21' (Fig. 3) of shaft 14. Again line 28 in shaft 15 would then correspond to line 22 in shaft 14.

From this description of the identical grooving in the abutting ends of each of the shafts 14 and 15 it will be clear that when the shafts are thrust against each other, in the manner illustrated in Fig. 1, provided the opposite ends of the shafts are in axial alignment, the following results will be obtained:

(1) The two shafts will be accurately positioned in axial alignment, (2) The shafts will rotate in unison when driving shaft 14 rotates, (3) No rotation of shaft 15 whatsoever is possible without rotation of shaft 14.

This condition exists as long as sufficient axial or longitudinal thrust is maintained to hold the two shafts 14 and 15 against any possible longitudinal movement with respect to each other. It will also be apparent that cessation or release of the longitudinal thrust will immediately release the connection between the two shafts.

Figure 4:
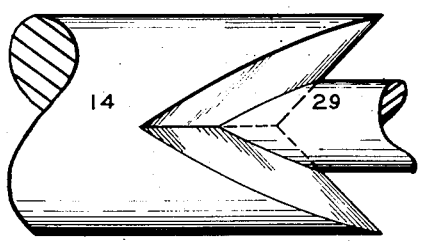
Fig. 4 is a related fragmentary elevation illustrating how a driven shaft of considerably different diameter from that of the driving shaft may be used optionally.

In Figs. 1 and 2 the two shafts 14 and 15 are illustrated as being nearly of the same diameter. However, our invention can be employed regardless of the comparative diameters of the two shafts. This is illustrated in Fig. 4 in which the shaft 14 is shown in engagement with the similarly grooved end of shaft 29 of much smaller diameter. All that is necessary in carrying out our invention is that the two ends of the two shafts be grooved in exactly the same manner, the grooving in each shaft end comprising a pair of identical grooves, with all four lines of intersection formed by the four plane faces of the two grooves being of identical length and all meeting on the axis. Thus, in the lathe assembly of Fig. 1, the lathe center spindle 13, instead of being conically shaped at the end could be grooved in the same way and likewise the right hand end of shaft 15. This would also enable shaft 15 to be reversible.

Figure 5:
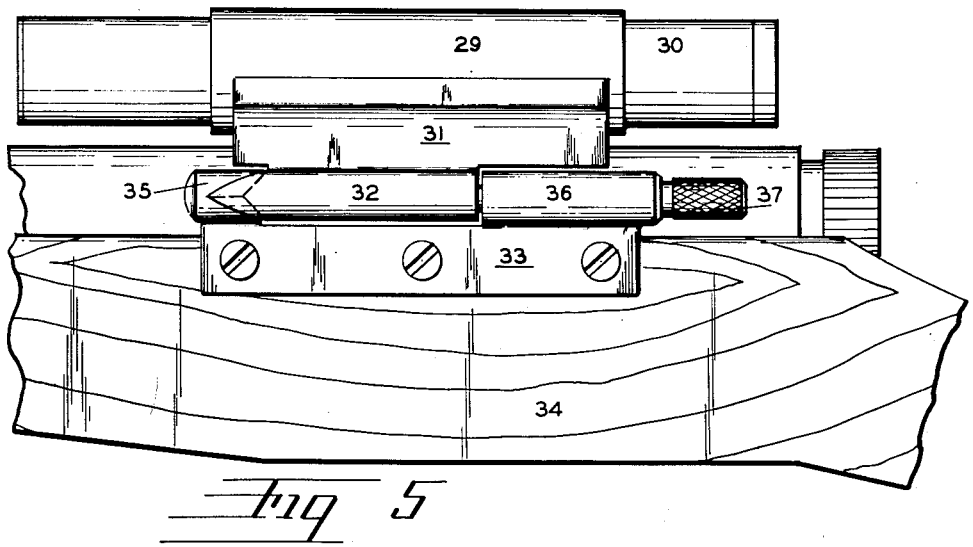
Fig. 5 is an elevation of a telescopic sight mounting on a gun, illustrating the employment of our invention when a member is required to be accurately, rigidly, but detachably secured to a fixed supporting element and held against all rotatable movement.
Figure 6:
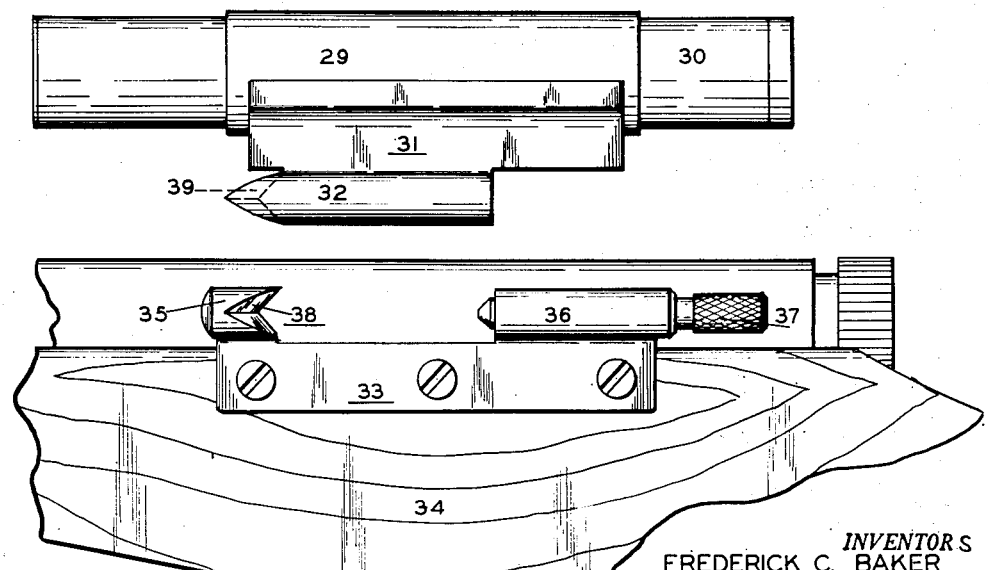
Fig. 6 is a similar elevation but showing the member and its supporting element separated.

In Fig. 1 we have shown our invention employed as a means of detachably connecting two shafts which are to be rotated in unison, one acting as the driving shaft and the other as the driven shaft. In Figs. 5 and 6, as previously indicated, we show an application of our invention when a member is to be accurately and rigidly, but demountably, positioned with respect to a fixed element. Figs. 5 and 6 illustrate a detachable telescopic sight mounting for a gun similar to the mounting described in our co-pending application for patent Serial No. 680,206 filed under date of June 28, 1946, and entitled Detachable telescopic sight mounting.

The mounting for the telescopic sight 30 of Figs. 5 and 6, by means of which the telescopic sight is removably secured in place on the gun 34 comprises two main parts 31 and 33. The part 31 includes a sleeve 39, within which the telescopic sight 30 is firmly fixed, and an integral shaft-like member 32, the axis of which is parallel to the axis of the telescopic sight 30. The part 33, which is firmly and permanently secured to the gun 34, includes an integral element 35 and an integral tube 36 threaded on its inner cylindrical surface to engage the threads of a thumb screw 37 extending longitudinally therethrough. The inner tip of the thumb screw 37 is cone shaped, and the shaft-like member 32 of the other part 31 has a central conical recess (not shown) in the right hand end (as viewed in Figs. 5 and 6) adapted to be engaged by the inner end of the screw 37 when the two parts are in engagement.

The inner or right hand end of the stationary element 35 and the opposed or left hand end of the shaft-like member 32 are grooved in accordance with our invention, this grooving of the element 35 being shown at 38 in Fig. 6, and the corresponding grooving on the left hand end of the shaft-like member 32 being indicated in part by the broken lines 39 in the same figure.

When the telescopic sight is to be mounted in place on the gun the member 32 of the part 31 is positioned in alinement with the thumb screw 37 and the element 35. The thumb screw 37 is then tightened as its conical tip engages the conical recess. This tightening of thumb screw 37 exerts the necessary longitudinal pressure on member 32 and forces it into firm engagement with the abutting end of stationary element 35. If the grooving in the opposed ends of stationary element 35 and member 32 has been done correctly in accordance with our invention it will be apparent from the previous description that when sufficient longitudinal pressure is exerted and maintained by the thumb screw, the member 32, and with it the integral part 31 and the telescopic sight 30 secured therein, will be accurately and rigidly fixed in predetermined position with respect to part 33 and thus with respect to the gun 34. When it is desired to remove the telescopic sight from the gun this of course is quickly and easily done merely by loosening the thumb screw 37 sufficiently to enable member 32 to be lifted from engagement with stationary element 35 and the thumb screw. Consequently the gun sight can be set in position on the gun or demounted from the gun with a minimum of time and effort, and, provided the various parts are properly made and accurately alined, a variation of not even one one-thousandth of an inch in the positioning of the telescopic sight will occur in spite of frequent demounting and remounting of the telescopic sight. This is a very important use of our invention. Other related uses of our invention will suggest themselves.

In actual practice we consider it preferable to have the intersecting edge lines of the two dihedral angles, thus the edges 22 and 23 of Figs. 2 and 3, in each abutting end, slightly rounded or dulled instead of being left as knife-like edges which would ordinarily result from the cutting of the two dihedral angles or grooves in each member or element. Dulling or rounding these edges slightly not only reduces wear in the surfaces of the grooves as the two ends are repeatedly moved into contact, but also prevents any minute dirt particles which may become lodged in the vertex lines or troughs of the grooves, thus on the line 21 for example, and which may escape attention, from preventing accurate positioning and alinement.

While the longitudinal force, bringing the two abutting ends into contact and holding them pressed against each other, has been described as a longitudinal "thrust," it is conceivable that a longitudinal "pull" might be substituted for the "thrust," for example, under the influence of a strong electro-magnet.

While modifications could be made in the end grooving of the abutting members in carrying out somewhat the same idea, we have found various modifications to be less successful and less practical. An important feature of the particular grooving which we have described is the fact that both of the abutting ends are grooved in exactly the same manner. This is not only an economy and aid in preparing and machining the ends of the respective members but it eliminates all doubt of the satisfactory attainment of the desired result.

We claim:

1. In a detachable mounting of the character described, a supporting element, a member movable into alignment with said element, said element and said member having opposed identically formed mating ends, means for holding the other end of said member in desired position, and means for causing said opposed ends of said element and member to bear against each other under a maintained longitudinal thrust, said opposed end of said element formed with two identical V-shaped grooves extending inwardly and forwardly from diametrically opposite points on the outer surface of said element to the end of said element, the bottom groove lines of said grooves meeting at the center point of said element end, said grooves intersecting each other on two converging lines of intersection extending outwardly and forwardly from said center point to diametrically opposite terminal points of said element end, the plane of said converging lines of intersection being perpendicular to the plane of said bottom groove lines of said grooves, said opposed end of said member being identically grooved with a corresponding pair of V-shaped grooves extending inwardly and forwardly from diametrically opposite points on the outer surface of said member to the center of said end of said member, whereby, when said member is placed in alignment with said element and said opposed ends are caused to bear against each other, the converging lines of intersection of the pair of grooves in each of said ends will coincide with the bottom groove lines in the other of said ends and the faces of said grooves of said ends will be in inter-engaging position.

2. In a mounting for shafts and the like, a supporting element, a shaft movable into axial alignment with said element, said element and said shaft having opposed identically formed, mating ends, means for supporting the other end of said shaft in alignment with said element, and means for causing said opposed ends of said element and shaft to bear against each other under a maintained axial thrust, said opposed end of said element formed with two identical V-shaped grooves extending inwardly and forwardly from diametrically opposite points on the outer surface of said element to the end of said element, the bottom groove lines of said grooves meeting at the center point of said element end, said grooves intersecting each other on two converging lines of intersection extending outwardly and forwardly from said center point to diametrically opposite terminal points of said element end, the plane of said converging lines of intersection being perpendicular to the plane of said bottom groove lines of said grooves, said opposed end of said shaft being identically grooved with a corresponding pair of V-shaped grooves extending inwardly and forwardly from diametrically opposite points on the outer surface of said shaft to the center of said end of said shaft, whereby, when said shaft is placed in axial alignment with said element and said opposed ends are caused to bear against each other, the converging lines of intersection of the pair of grooves in each of said ends will coincide with the bottom groove lines in the other of said ends and the faces of said grooves of said ends will be in inter-engaging position.

3. In a detachable mounting for a telescopic sight, a supporting element mounted in fixed position on a gun, a member movable into alignment with said element, said element and said member having opposed identically formed, mating ends, means mounted on the gun for holding the other end of said member in desired position, and means for causing said opposed ends of said element and member to bear against each other under a maintained longitudinal force, said opposed end of said element formed with two identical V-shaped grooves extending inwardly and forwardly from diametrically opposite points on the outer surface of said element to the end of said element, the bottom groove lines of said grooves meeting at the center point of said element end, said grooves intersecting each other on two converging lines of intersection extending outwardly and forwardly from said center point to diametrically opposite terminal points of said element end, the plane of said converging lines of intersection being perpendicular to the plane of said bottom groove lines of said grooves, said opposed end of said member being identically grooved with a corresponding pair of V-shaped grooves extending inwardly and forwardly from diametrically opposite points on the outer surface of said member to the center of said end of said member, whereby, when said member is placed in alignment with said element and said opposed ends are caused to bear against each other, the converging lines of intersection of the pair of grooves in each of said ends will coincide with the bottom groove lines in the other of said ends and the faces of said grooves of said ends will be in inter-engaging position.

FREDERICK C. BAKER.
E. GARY SPENCER.

REFERENCES CITED

The following references are of record in the file of this patent:

UNITED STATES PATENTS

| Number | Name | Date |
|---|---|---|
| 173,356 | Sloan | Feb. 8, 1876 |
| 1,036,105 | Hartness | Aug. 20, 1912 |
| 1,440,494 | Roach | Jan. 2, 1923 |
| 1,908,081 | Thompson | May 9, 1933 |
| 2,046,837 | Phillips | July 7, 1936 |
| 2,119,925 | Peterson | June 7, 1938 |
| 2,401,825 | Gruver | June 11, 1946 |

FOREIGN PATENTS

| Number | Country | Date |
|---|---|---|
| 113,786 | Switzerland | 1926 |